United States Patent
Kang et al.

(10) Patent No.: US 8,280,399 B2
(45) Date of Patent: Oct. 2, 2012

(54) METHOD AND SYSTEM FOR CONTROLLING LOCATION UPDATE AND PAGING, CONSIDERING LOCATION CHARACTERISTICS OF MOBILE STATION IN A COMMUNICATION SYSTEM

(75) Inventors: Hyon-Goo Kang, Suwon-si (KR); Jin-Kwan Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 682 days.

(21) Appl. No.: 12/394,865

(22) Filed: Feb. 27, 2009

(65) Prior Publication Data

US 2009/0227265 A1 Sep. 10, 2009

(30) Foreign Application Priority Data

Mar. 4, 2008 (KR) .................. 10-2008-0020129

(51) Int. Cl.
*H04M 1/00* (2006.01)
(52) U.S. Cl. .................. 455/456.1; 455/414; 455/404.1
(58) Field of Classification Search ............... 455/404.2, 455/414.2, 436–442, 456.1–458
See application file for complete search history.

(56) References Cited

U.S. PATENT DOCUMENTS

| | | | |
|---|---|---|---|
| 6,671,514 B1 | 12/2003 | Cedervall et al. | |
| 2003/0050075 A1 | 3/2003 | Rangarajan et al. | |
| 2005/0250474 A1* | 11/2005 | Hong et al. | 455/411 |
| 2006/0089161 A1* | 4/2006 | Kim et al. | 455/458 |
| 2007/0191031 A1* | 8/2007 | Mohanty et al. | 455/458 |
| 2007/0293244 A1* | 12/2007 | Lee et al. | 455/456.5 |
| 2009/0080359 A1* | 3/2009 | Song et al. | 370/312 |

OTHER PUBLICATIONS 802.16e.*

* cited by examiner

*Primary Examiner* — Jinsong Hu
*Assistant Examiner* — Michael Nguyen
(74) *Attorney, Agent, or Firm* — Jefferson IP Law, LLP

(57) ABSTRACT

A method and system for controlling a location update of a Mobile Station (MS) and paging the MS, taking into account location characteristics of the MS in a communication system are provided. The system for controlling the location update includes the MS for receiving a broadcasting message from a preferred BS during a PLI, for determining whether a paging group is changed, for verifying lazy location update information in the broadcasting message to delay a location update of the MS, if the paging group is changed and for updating a location of the MS according to the lazy location update information.

22 Claims, 8 Drawing Sheets

METHOD AND SYSTEM FOR CONTROLLING LOCATION UPDATE AND PAGING, CONSIDERING LOCATION CHARACTERISTICS OF MOBILE STATION IN A COMMUNICATION SYSTEM

PRIORITY

This application claims the benefit under 35 U.S.C. §119(a) of a Korean patent application filed in the Korean Intellectual Property Office on Mar. 4, 2008 and assigned Serial No. 10-2008-0020129, the entire disclosure of which is hereby incorporated by reference.

BACKGROUND OF THE INVENTION

1. Field of the Invention

The present invention relates to a method and system for controlling a location update of a Mobile Station (MS) and paging the MS taking into account location characteristics of the MS in a Broadband Wireless Access (BWA) communication system.

2. Description of the Related Art

Most wireless networks including a BWA network support handover for an MS. To efficiently support the handover, it is preferred to reduce handover-caused system load and power consumption of the MS and to shorten a time delay involved in completing the handover process.

Handovers over a wireless network can be categorized into an active-mode handover, for an MS that operates in the active mode, and an idle-mode handover, for an MS that operates in the idle mode.

If an update condition is met, the MS that performed the idle handover performs a location update by registering its location with a paging controller via a Base Station (BS). The paging controller is a network entity that manages idle-mode MSs. The Institute of Electrical and Electronics Engineers (IEEE) 802.16e standard defines four location update conditions, which will be taken as an example herein. The four location update conditions include a paging group update, a timer update (periodic time), a power-down update and a Media Access Control (MAC) hash skip threshold update.

The MS updates its location according to the four location update conditions, as follows.

In the paging group update, the MS receives a broadcast paging group Identifier (ID) from a preferred BS during a Paging Listening Interval (PLI) that was negotiated preliminarily with the network and determines whether the paging group ID is identical to a last paging group ID that the MS is aware of. The paging group ID is set in a Downlink Channel Descriptor (DCD) or a Mobile_Paging-Advertisement (MOB_PAG-ADV) message. Upon detection of a change in the paging group ID, the MS performs location update. The preferred BS is a BS that the MS synchronizes its timing to during the PLI. The DCD is a broadcasting message including information required for the MS to receive a downlink message and downlink traffic from the preferred BS. The MOB_PAG-ADV message is a broadcasting message including information indicating whether an incoming signal has been generated for an MS registered to a paging group of the preferred BS and the ID of the paging group. The paging group includes BSs that cover areas in which the MS can receive the MOB_PAG-ADV message indicating generation of an incoming signal for the MS. One BS can belong to one or more paging groups.

In the timer update, the MS is equipped with an idle mode timer. Before expiration of the idle mode timer, the MS performs location update.

In the power-down update, the MS notifies the paging controller managing the MS of its power-down as a power-down procedure. Then the paging controller does not manage information regarding the MS any longer by deleting the information regarding the MS. The power-down refers to reduction of power consumption in time periods other than the PLI in the idle-mode MS. The power consumption occurs during an unavailable paging interval.

In the MAC hash skip threshold update, the MS performs location update, if the count of the MS managed MAC hash skip counter exceeds a MAC hash skip threshold. The MAC hash skip threshold is acquired from a Deregistration Command (DREG-CMD) message that the MS should receive from the preferred BS to enter the idle mode during initial ranging. When the location update is successful, the BS and the MS initialize their MAC hash skip counters. The DREG-CMD message is a message used for the BS to command the MS to change its operation mode to the idle mode. The MAC hash skip threshold defines a maximum number of successively received MOB_PAG-ADV messages that do not have MAC address hashes.

An MS located in a cell having obvious mobility characteristics, such as a cell under a company-like or building-like indoor environment, has inertia in mobility. The inertia affects the update location operation of the MS. For example, when the MS moves into a building, its mobility is substantially low. That is, when a user works at his workstation or participates in a meeting, the mobility of his MS is almost zero. Nonetheless, an unnecessary location update takes place conventionally.

When the user's continuous movement in an elevator of a building is not fast for a certain time period, the MS performs frequent location updates due to a bad channel environment.

The conventional location update operation does not reflect the location characteristics of the MS. Therefore, signaling overhead increases during location updates between the BS and the MS.

Therefore, a need exists for a system and method for delaying a location update of a Mobile Station (MS) and paging the MS.

SUMMARY OF THE INVENTION

An aspect of the present invention is to address at least the above-mentioned problems and/or disadvantages and to provide at least the advantages described below. Accordingly, an aspect of the present invention is to provide a method and apparatus for delaying a location update of a Mobile Station (MS) that is placed in a cell having clear mobility characteristics.

Another aspect of the present invention is to provide a method and apparatus for delaying a location update of an MS, taking into account characteristics of downlink data traffic directed to the MS.

A further aspect of the present invention is to provide a method and apparatus for generating a broadcasting message that includes information regarding a method for delaying a location update of an MS.

Still another aspect of the present invention is to provide a method and apparatus for determining the paging cycle of an MS.

In accordance with an aspect of the present invention, a location update method of an MS operating in an idle mode in a communication system is provided. The method includes receiving a broadcasting message from a preferred Base Station (BS) during a Paging Listening Interval (PLI), determining whether a paging group is changed, verifying lazy location update information in the broadcasting message to delay a location update of the MS, if the paging group is changed, and updating a location of the MS according to the lazy location update information.

In accordance with another aspect of the present invention, a method for controlling a location update of an MS in a paging controller that manages at least one MS operating in an idle mode in a communication system is provided. The method includes determining a type of downlink data traffic for the MS is determined, upon generation of the downlink data traffic during a PLI of the MS operating in the idle mode, generating lazy location update information for controlling a lazy location update of the MS, if the type of downlink data traffic is not real-time traffic, and transmitting a broadcasting message including the lazy location update information to the MS through a preferred BS of the MS and paging the MS in accordance with the lazy location update information.

In accordance with a further aspect of the present invention, a location update controlling system in a communication system is provided. The location update controlling system includes an MS for operating in an idle mode, for receiving a broadcasting message from a preferred BS during a PLI, for determining whether a paging group is changed, for verifying lazy location update information in the broadcasting message to delay a location update of the MS, if the paging group is changed and for updating a location of the MS according to the lazy location update information.

In accordance with still another aspect of the present invention, a location update controlling system in a communication system is provided. The location update controlling system including a paging controller for controlling a location update of an MS operating in an idle mode, the paging controller includes a call controller for determining a type of downlink data traffic for the MS, upon generation of the downlink data traffic during a PLI of the MS, a message generator for generating lazy location update information for controlling a lazy location update of the MS, if the type of downlink data traffic is not real-time traffic, and a transmitter for transmitting a broadcasting message including the lazy location update information to the MS through a preferred BS of the MS and paging the MS in accordance with the lazy location update information.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a method and apparatus for delaying a location update of a Mobile Station (MS) and paging the MS, when the MS is located in a cell having clear mobility characteristics, such as in an indoor environment in a Broadband Wireless Access (BWA) communication system. Exemplary embodiments of the present invention also provide an apparatus and method for, when a paging controller decides to delay a location update of an MS, notifying the MS of the delay. The following description is made in the context of an Orthogonal Frequency Division Multiple Access (OFDMA) and an IEEE 802.16e communication system that operates in the OFDMA as an example of the BWA communication system.

Figure 1:
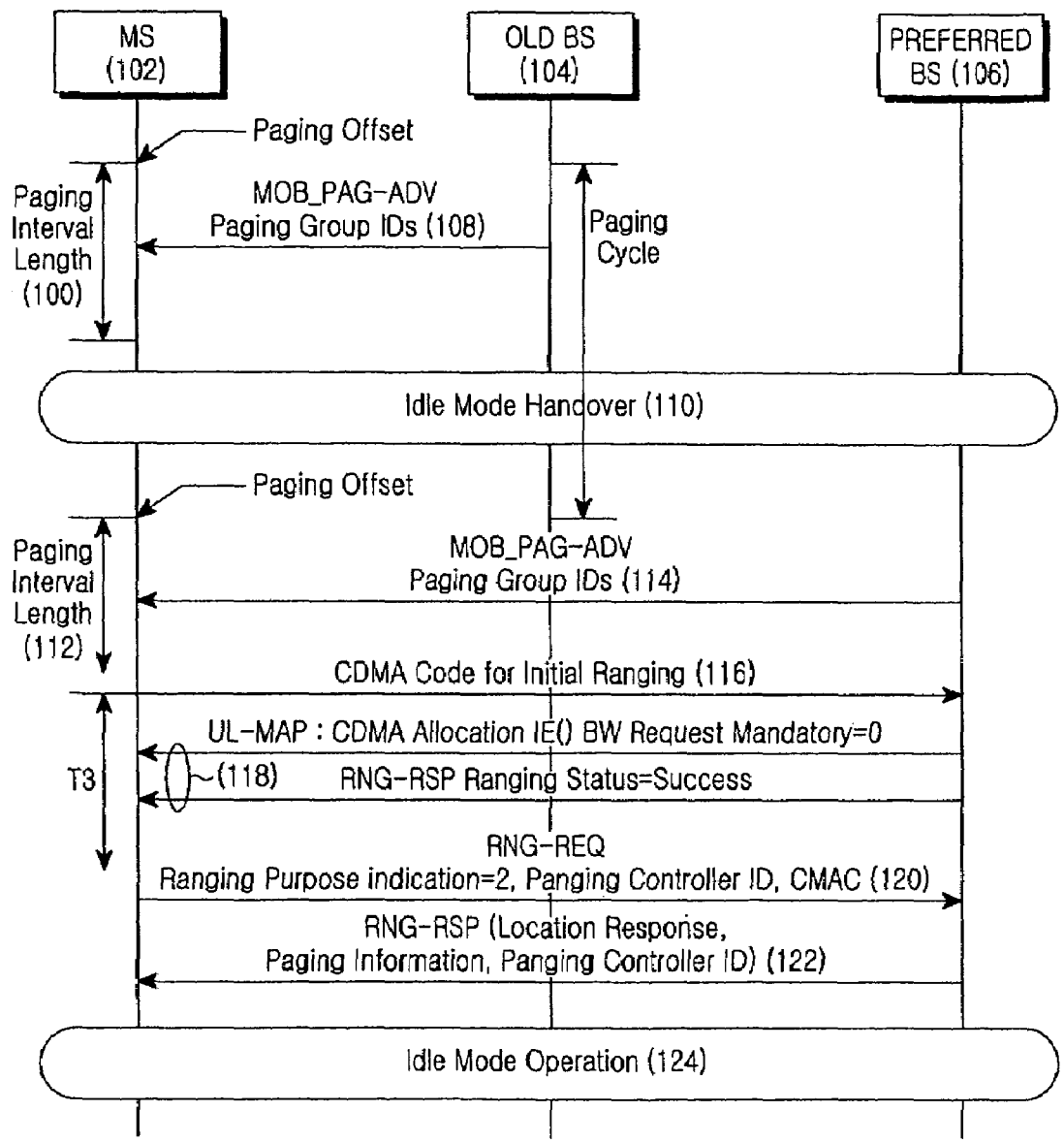
FIG. 1 is a diagram illustrating a signal flow for a location update operation according to an exemplary embodiment of the present invention.

FIG. 1 is a diagram illustrating a signal flow for a location update operation according to an exemplary embodiment of the present invention. It is assumed herein that the location update is triggered by a change of a paging group.

Referring to FIG. 1, reference numeral 102 denotes an idle-mode MS, reference numeral 104 denotes an old Base Station (BS) currently connected to the MS 102 and reference numeral 106 denotes a preferred BS to which the MS 104 will perform idle handover.

The MS 102 acquires first paging group IDs by receiving a first Mobile_Paging-Advertisement (MOB_PAG-ADV) message from the old BS 104 during a first Paging Listening Interval (PLI) 100 in step 108. The first paging group IDs are the IDs of paging groups to which the old BS 104 belongs to.

In step 110, the MS 102 performs idle-mode handover to the preferred BS 106. The MS 102 acquires second paging group IDs by receiving a second MOB_PAG-ADV message from the preferred BS 106 during a second PLI 112 in step 114. The second paging group IDs are the IDs of paging groups to which the preferred BS 106 belongs to.

Upon detection of a change in paging group IDs by comparing the first paging group IDs with the second paging group IDs, the MS 102 transmits an initial (or dedicated) ranging Code Division Multiple Access (CDMA) code for location update to the preferred BS 106 in step 116. In step 118, the preferred BS 106 transmits a response for ranging and bandwidth allocation information for uplink message transmission to the MS 102.

The MS 102 transmits a Ranging-Request (RNG-REQ) message according to the uplink bandwidth allocation information to the preferred BS 106 in step 120. A Type, Length and Value (TLV) of a Ranging Purpose Indication field is set to a value indicating a location update request in the RNG-REQ message.

In step 122, the preferred BS 106 transmits information indicating a successful location update to the MS 102 by a Ranging-Response (RNG-RSP) message in response to the RNG-REQ message. The RNG-RSP message includes a new paging cycle and paging information with a paging offset, a paging group ID and a paging interval length.

The MS 102 updates a PLI valid to the preferred BS 106 based on the paging information in step 124. Then the MS 102 receives a MOB_PAG-ADV message including lazy location update information to delay the location update of the MS 102 from the preferred BS 106 according to an exemplary embodiment of the present invention. The lazy location update information includes location update control information for the MS 102, which the paging controller set, taking into account the location of the MS 102 and characteristics of data traffic of the MS 102.

Figure 2:
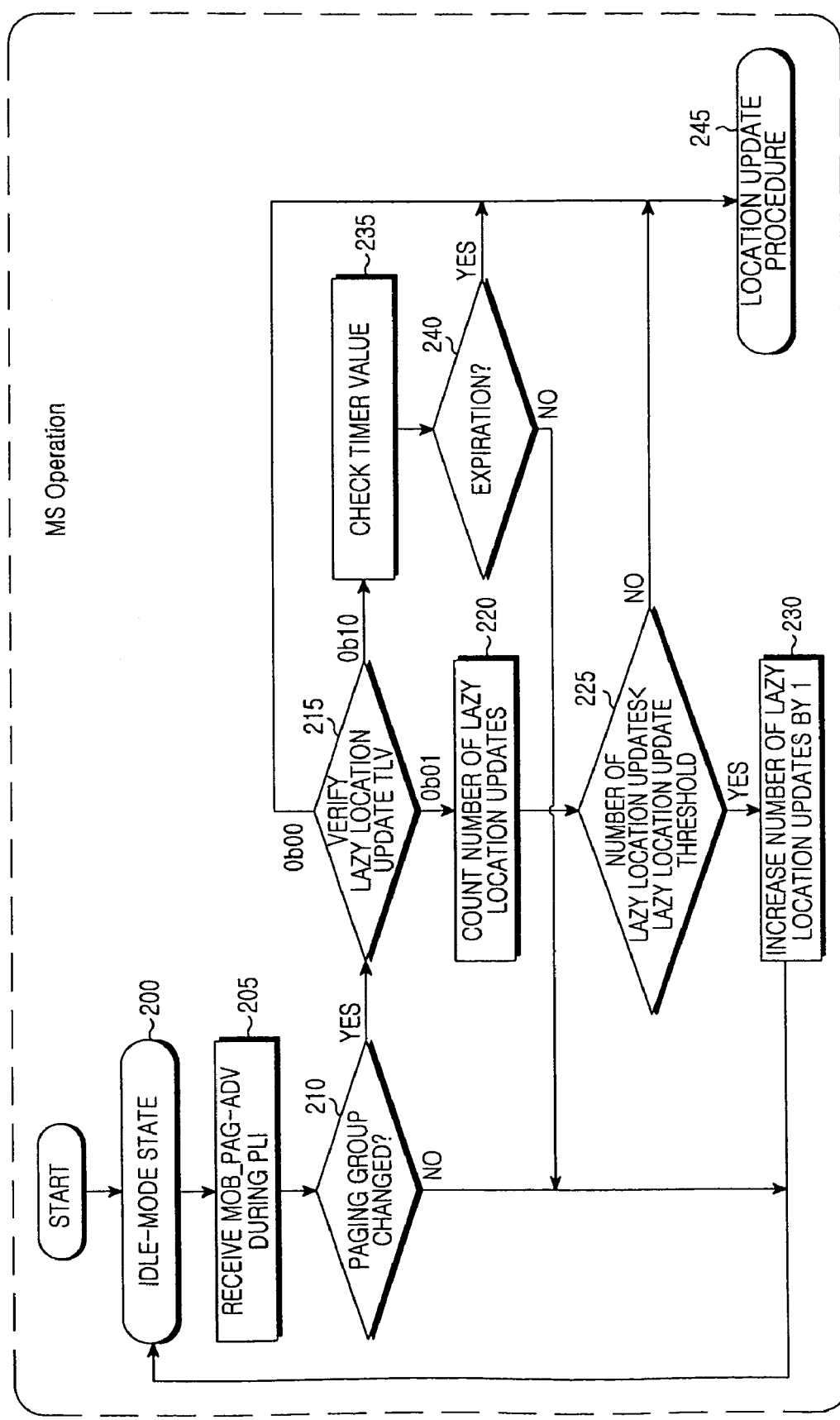
FIG. 2 is a flowchart illustrating an operation for determining whether to update a location in an MS according to an exemplary embodiment of the present invention.

FIG. 2 is a flowchart illustrating a location update operation of the MS according to an exemplary embodiment of the present invention. Herein, it is assumed that the location update is triggered by a change in a paging group.

Referring to FIG. 2, the MS operates in an idle mode in step 200 and wakes up in a PLI and receives a MOB_PAG-ADV message from its preferred BS in step 205. The PLI has a length determined by the paging controller and the MS is already aware of the PLI during initial ranging to the preferred BS before the idle mode. The MOB_PAG-ADV message includes paging group IDs and a Lazy Location Update TLV field indicating whether to delay a location update.

In step 210, the MS determines whether its paging group ID is included among the paging group IDs acquired from the MOB_PAG-ADV message. The paging group ID of the MS is a last paging group ID that it is aware of.

If the paging group ID of the MS is included, the MS returns to the idle mode in step 200.

If the paging group ID of the MS is not included, the MS determines that its paging group has been changed and verifies the Lazy Location Update TLV field in step 215. It is assumed that the MS has prior knowledge of the meanings of Lazy Location Update TLV values through negotiations with a network. If Bit #0 to Bit #1 of the Lazy Location Update TLV are set to '0b01' indicating that a location update is allowed according to a preset lazy location update threshold, the MS proceeds to step 220. The lazy location update threshold is preset by the network, filled in Bit #2 to Bit #15 of the Lazy Location Update TLV field. The MS counts the number of location update attempts in step 220 and compares the count with the lazy location update threshold in step 225. If the count is less than the lazy location update threshold, the MS increases the count by 1 in step 230 and returns to step 200 to operate in the idle mode. If the count is larger than or equal to the lazy location update threshold, the MS updates its location by changing the paging group normally in step 245.

If Bit #0 to Bit #1 of the Lazy Location Update TLV field is '0b10' indicating that a location update is allowed according to the value of an internal timer of the MS, the MS proceeds to step 235. The value of the timer is preset by the network, filled in Bit #2 to Bit #15 of the Lazy Location Update TLV field. If the value set in Bit #2 to Bit #15 is '0', the MS autonomously sets the value of the timer.

The MS verifies the value of the timer in step 235 and determines whether the timer has expired in step 240. Upon expiration of the timer, the MS updates its location by changing the paging group in step 245. If the timer is still running, the MS returns to step 200 to operate in the idle mode.

If Bit #0 to Bit #1 of the Lazy Location Update TLV field is '0b00' indicating that a lazy location update is not allowed in step 215, the MS updates its location by changing the paging group in step 245. If the Lazy Location Update TLV field is not included in the MOB_PAG-ADV message, the MS also updates its location by changing the paging group, considering that a lazy location update is not allowed in step 245.

Figure 3:
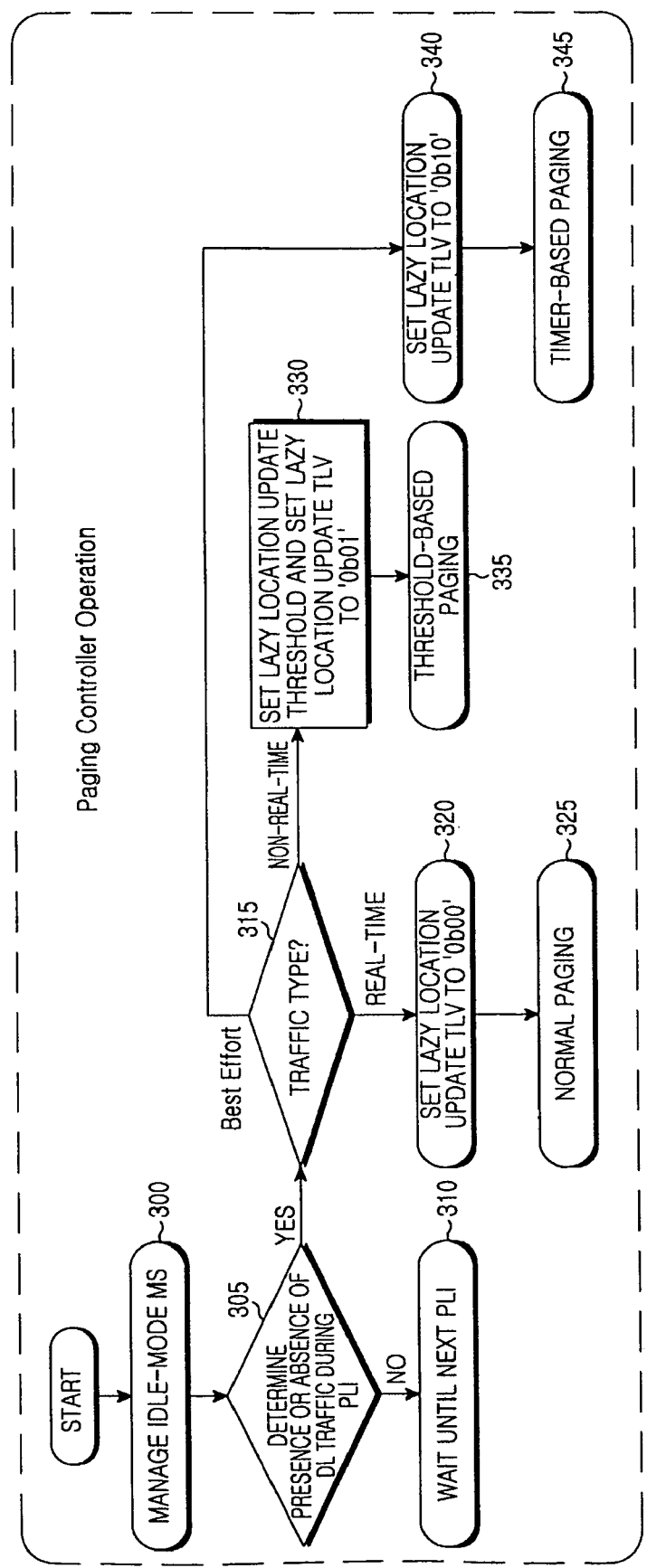
FIG. 3 is a flowchart illustrating an operation of a paging controller according to an exemplary embodiment of the present invention.

With reference to FIG. 3, a description will be made of an operation for generating information for controlling the location update of the MS according to characteristics of data traffic and performing a paging procedure based on the information in the paging controller according to an exemplary embodiment of the present invention.

FIG. 3 is a flowchart illustrating an operation of the paging controller according to an exemplary embodiment of the present invention. While the paging controller manages a single MS in the illustrated case of FIG. 3, it is merely for ease of description. Accordingly, it is understood that the present invention includes implementations in which the paging controller manages one or more MSs.

Referring to FIG. 3, the paging controller manages the idle-mode MS in step 300 and determines a presence or an absence of downlink traffic for the MS in a PLI that was preset and known to the MS in step 305. PLI setting of the paging controller will be detailed later with reference to FIGS. 4 to 7. In the absence of downlink traffic, the paging controller waits until the next PLI in step 310.

In the presence of downlink traffic, the paging controller verifies the type of downlink traffic in step 315. If the downlink traffic is real-time traffic, the paging controller goes to step 320. The real-time traffic may be from a Continuing Grant service, a Real-time Variable Rate service or an Extended Real-time Variable Rate service. In step 320, the paging controller sets Bit #0 to Bit #1 of a Lazy Location Update TLV field to '0b00' or excludes the Lazy Location Update TLV field, to not allow a lazy location update to the MS. The paging controller performs a normal paging procedure in step 325. That is, the paging controller transmits a MOB_PAG-ADV message with the Lazy Location Update TLV field set to '0b00' or a MOB_PAG-ADV message without a Lazy Location Update TLV field to the MS via the preferred BS.

On the other hand, if the type of downlink traffic is non-real-time traffic in step 315, the MS proceeds to step 330. The non-real time traffic may be from a Non-real-time Variable Rate service. In step 330, the paging controller sets Bit #0 to Bit #1 of the Lazy Location Update TLV field to '0b01' to delay the location update of the MS based on a lazy location update threshold and sets the lazy location update threshold in Bit #2 to Bit #15 of the Lazy Location Update TLV field. In step 335, the paging controller performs a paging operation based on the lazy location update threshold. That is, the paging controller transmits a MOB_PAG-ADV message including the Lazy Location Update TLV field set to '0b01' to the MS through the preferred BS.

If the type of downlink traffic is Best Effort (BE) traffic in step 315, the paging controller sets Bit #0 to Bit #1 of the Lazy Location Update TLV field to '0b10' to delay the location update of the MS during a time period set to the timer of the MS and sets the time period in Bit #2 to Bit #15 of the Lazy Location Update TLV field in step 340. In step 345, the paging controller performs a paging operation based on the time period of the timer. That is, the paging controller transmits a MOB_PAG-ADV message including the Lazy Location Update TLV field set to '0b10' to the MS through the preferred BS.

The paging operation of step 335 illustrated in FIG. 3 will be described in more detail with reference to FIGS. 4 to 7.

Figure 4:
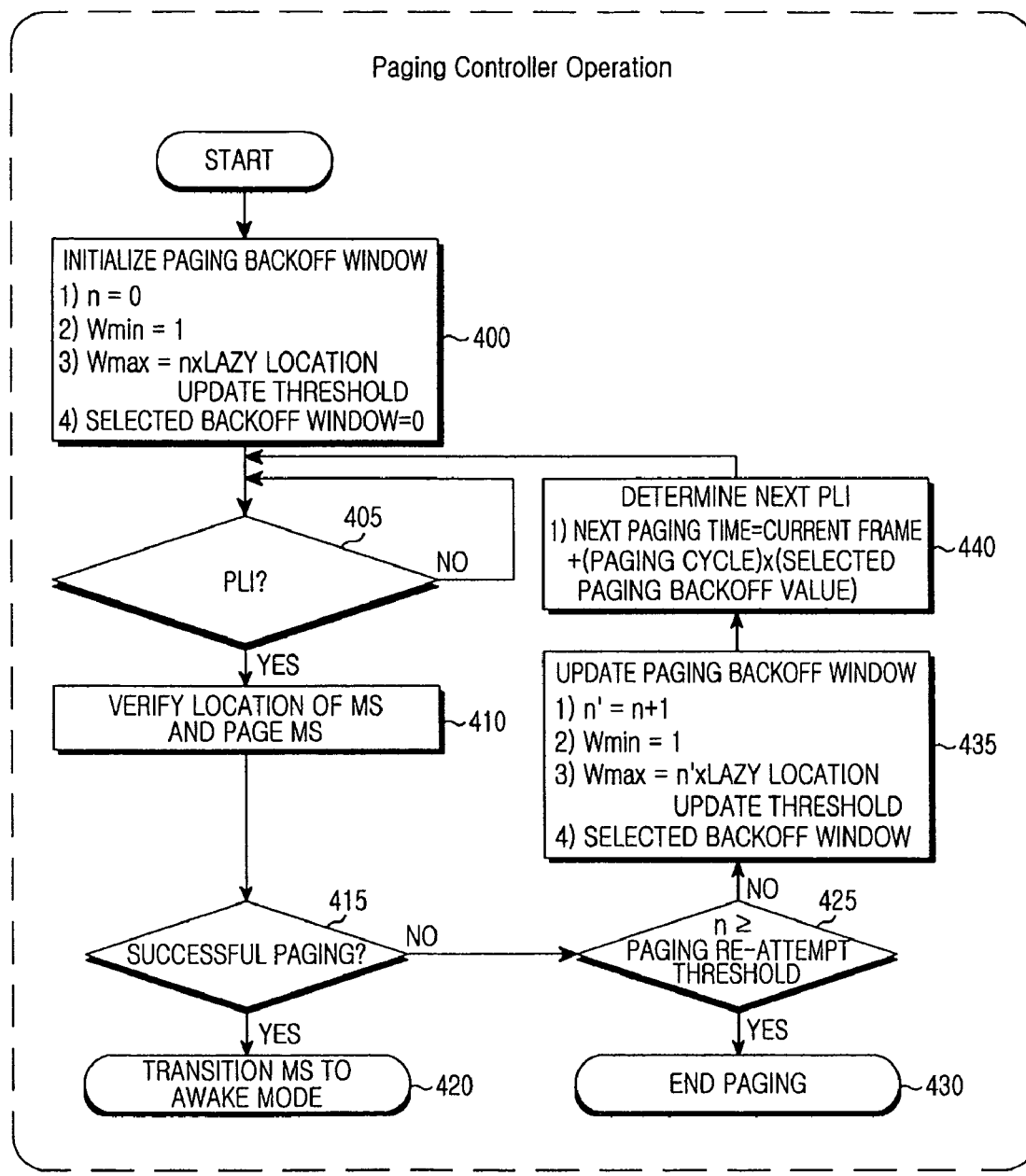
FIG. 4 is a flowchart illustrating a threshold-based paging operation of a paging controller according to an exemplary embodiment of the present invention.

FIG. 4 is a flowchart illustrating a threshold-based paging operation of the paging controller according to an exemplary embodiment of the present invention. If the paging controller fails to page its managed MS, a paging backoff window increases one-dimensionally, for example. The paging backoff window extends the PLI cycle of the MS.

Referring to FIG. 4, the paging controller initializes the paging backoff window in step 400. That is, the paging controller sets a variable (n) indicating the number of paging re-attempts to the MS to '0', sets a minimum value of the paging backoff window (Wmin) to '1' and sets a maximum value of the paging backoff window (Wmax) to n×lazy location update threshold. The paging controller also sets a selected paging window value to 0. The lazy location update threshold is preset by the network, written in Bit #2 to Bit #15 of the Lazy Location Update TLV field.

In step 405, the paging controller determines whether a PLI exists. If a PLI exists, the paging controller proceeds to step 410. Otherwise, the paging controller waits until a PLI exists.

The paging controller verifies the result of the MS's last location update, i.e., a cell in which the MS performs the last location update, determines the BS of the cell as a BS covering an area where the MS is located and transmits a paging-related message to the MS through the BS in step 410.

In step 415, the paging controller determines whether the paging is successful. That is, when the paging controller receives a response message for the paging-related message, the paging controller determines that the paging is successful. If the paging is successful, the paging controller transitions the MS from the idle mode to an awake mode in step 420.

In contrast, if the paging failed, the paging controller counts the number of paging re-attempts to the MS (n) and compares n with a certain paging re-attempt threshold in step 425. If n is equal to or greater than the paging re-attempt threshold, the paging controller ends paging the MS in step 430. That is, the paging controller excludes the MS from management.

If n is less than the paging re-attempt threshold, the paging controller updates the paging backoff window in step 435. Specifically, the paging controller counts the number of paging re-attempts to the MS (n) and sets n' to (n+1). The paging controller updates Wmax to the product between n and the lazy location update threshold and updates the paging backoff window value to one of randomly selected natural numerals between Wmin and the updated Wmax value. The paging controller determines the next PLI in step 440 and returns to step 405. That is, the next PLI is determined by equation (1) and notified to the MS through the preferred BS of the MS.

$$\text{Start frame of next PLI} = \text{start frame of current PLI} + (\text{current PLI cycle}) \times (\text{selected paging backoff window value}) \qquad (1)$$

wherein Wmin≦selected paging backoff window value≦Wmax, Wmin=1, and Wmax=n'×lazy location update threshold With reference to FIG. 5, an operation for updating a paging cycle in the paging controller operating in the manner illustrated in FIG. 4 will be described.

Figure 5:
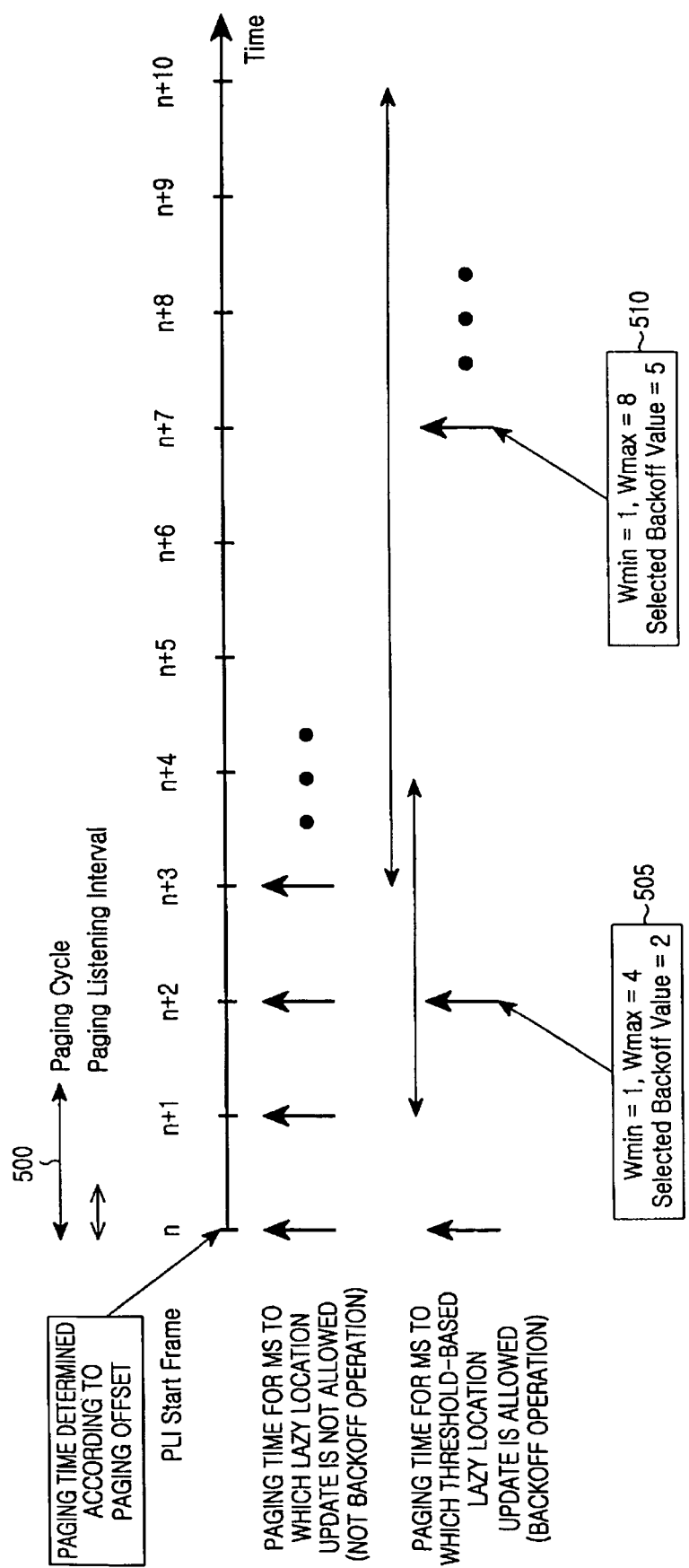
FIG. 5 illustrates a paging cycle update operation of a paging controller according to an exemplary embodiment of the present invention.

FIG. 5 illustrates a paging cycle update operation of the paging controller according to an exemplary embodiment of the present invention.

Referring to FIG. 5, it is assumed that the paging controller and the MS have prior knowledge of the lazy location update threshold being '4'. The lazy location update threshold is transmitted to the MS by a MOB_PAG-ADV message.

When the paging controller pages the MS at a first time in an $n^{th}$ PLI and fails to receive a response for the paging from the MS, the paging controller updates a paging cycle using a paging backoff window value according to equation (1) and performs paging with the updated paging cycle.

For example, the paging controller selects '2' randomly from among the natural numbers ranging from Wmin '1' to Wmax '4' as the paging backoff window value. The natural number '4' is a product between the lazy location update threshold '4' and a paging re-attempt number '1'. The paging controller adds the product between a current paging cycle 500 and '2' to the index of the current frame, n by equation (1), and sets the sum (n+2) 505 as the index of the next paging start frame. That is, the paging controller re-attempts the paging to the MS at a first time in the $(n+2)^{th}$ PLI 505 among $(n+1)^{th}$ to $(n+4)^{th}$ PLIs. If the paging controller fails to receive a response for the first paging re-attempt from the MS, the paging controller selects '5' randomly from among the natural numbers ranging from Wmin '1' to Wmax '8' as the paging backoff window value. The natural number '8' is a product between the lazy location update threshold '4' and a paging re-attempt number '2'. The paging controller adds the product between the current paging cycle 500 and '5' to the index of the current frame, (n+2) by equation (1), and sets the sum (n+7) 510 as the index of the next paging start frame. That is, the paging controller re-attempts the paging to the MS at a second time in the $(n+7)^{th}$ PLI 510.

Figure 6:
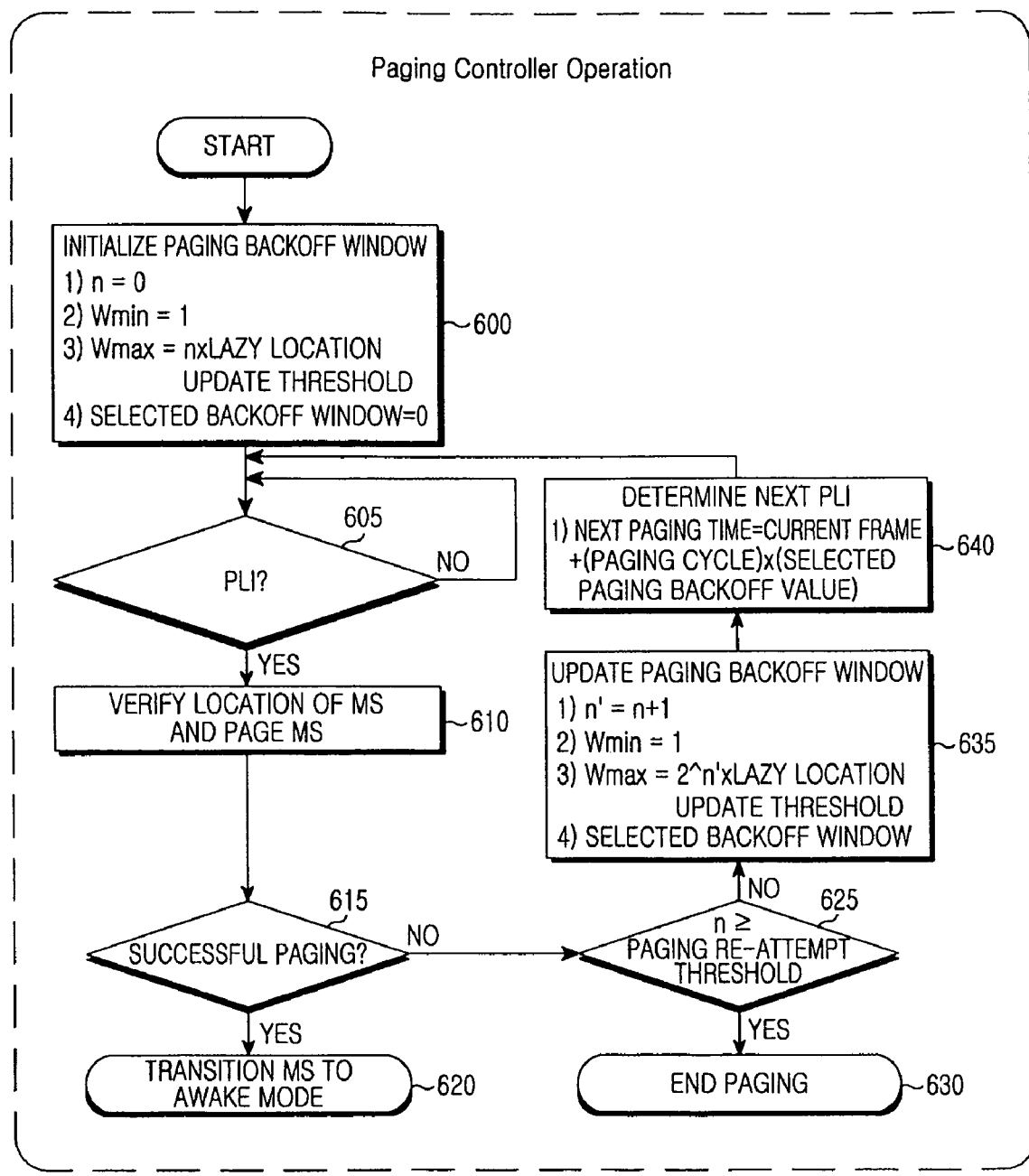
FIG. 6 is a flowchart illustrating a threshold-based paging operation of a paging controller according to an exemplary embodiment of the present invention.

FIG. 6 illustrates a paging cycle update operation of the paging controller according to an exemplary embodiment of the present invention. In the illustrated case of FIG. 6, if the paging controller fails to page its managed MS, the paging backoff window increases exponentially.

Referring to FIG. 6, the paging controller initializes the paging backoff window in step 600. That is, the paging controller sets a variable (n) indicating the number of paging re-attempts of the MS to '0', sets a minimum value of the paging backoff window (Wmin) to '1', and sets a maximum value of the paging backoff window (Wmax) to n×lazy location update threshold. The paging controller also sets a selected paging window value to '0'. The lazy location update threshold is preset in the network and written in Bit #2 to Bit #15 of the Lazy Location Update TLV field.

In step 605, the paging controller determines whether a PLI exists. If a PLI exists, the paging controller goes to step 610. Otherwise, the paging controller waits until a PLI exists.

The paging controller verifies the result of a last location update of the MS, determines a BS corresponding to the result as a BS covering an area where the MS is located and transmits a paging-related message, i.e., a MOB_PAG-ADV message, to the MS through the BS in step 610.

In step 615, the paging controller determines whether the paging is successful. That is, when the paging controller receives a response message for the MOB_PAG-ADV message, the paging controller determines that the paging is successful. If the paging is successful, the paging controller transitions the MS from the idle mode to an awake mode in step 620.

In contrast, if the paging failed, the paging controller counts the number of paging re-attempts to the MS (n) and compares n with a paging re-attempt threshold in step 625. If n is equal to or greater than the paging re-attempt threshold, the paging controller ends paging the MS in step 630. That is, the paging controller excludes the MS from management.

If the count n is less than the paging re-attempt threshold, the paging controller updates the paging backoff window in step 635. Specifically, the paging controller counts the number of paging re-attempts to the MS (n) and sets n' to (n+1). The paging controller updates Wmax to the product between 2n and the lazy location update threshold and updates the paging backoff window value to one of the natural numerals between Wmin and the updated Wmax value. The paging controller determines the next PLI in step 640 and returns to step 605. That is, the next PLI is determined by equation (2) and notified to the MS through the preferred BS of the MS.

$$\text{Start frame of next PLI} = \text{start frame of current PLI} + (\text{current PLI cycle}) \times (\text{selected paging backoff window value}) \quad (2)$$

wherein Wmin ≦ selected paging backoff window value ≦ Wmax, Wmin=1, and Wmax=$2^{\text{number of paging re-attempts }(n')} \times$ lazy location update threshold.

Figure 7:
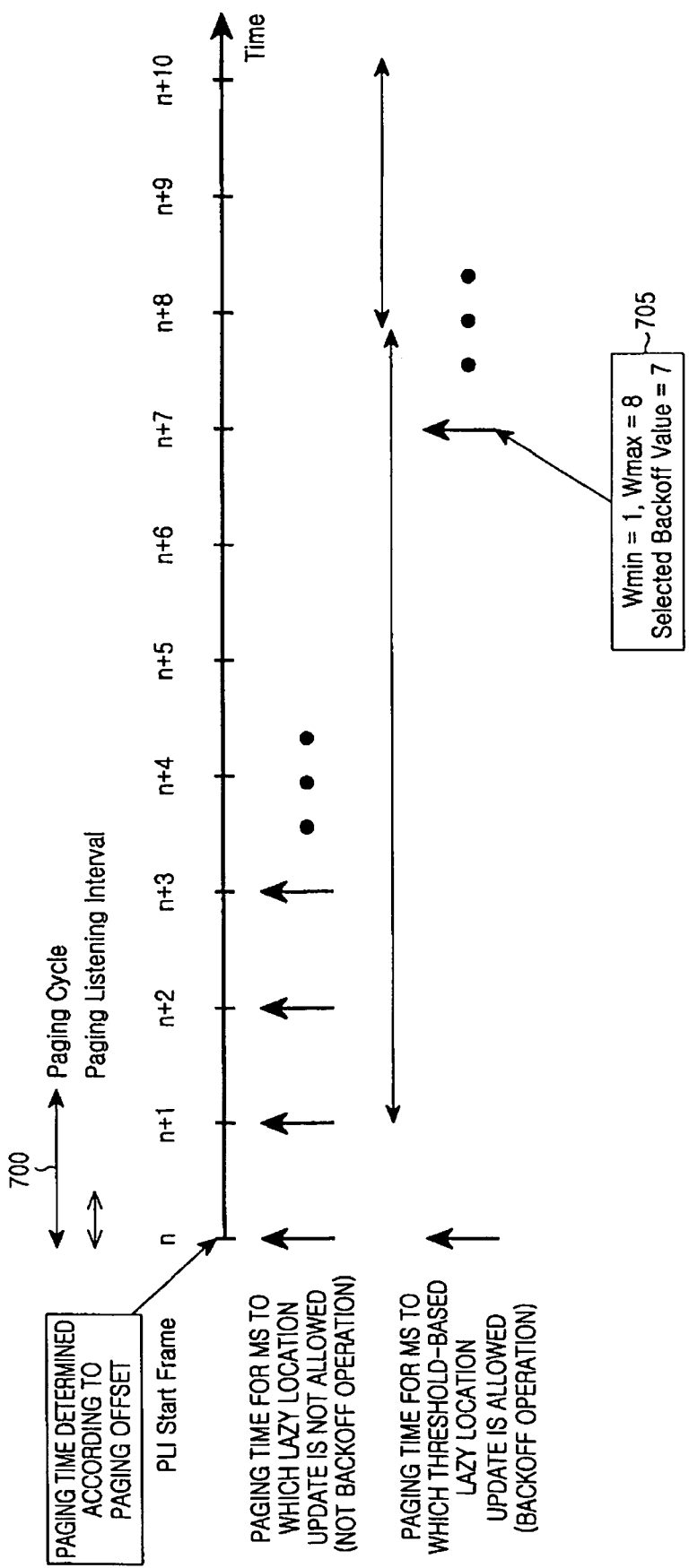
FIG. 7 illustrates a paging cycle update operation of a paging controller according to an exemplary embodiment of the present invention.

With reference to FIG. 7, an operation for updating a paging cycle in the paging controller operating in the manner illustrated in FIG. 6 will be described.

FIG. 7 illustrates a paging cycle update operation of the paging controller according to an exemplary embodiment of the present invention.

Referring to FIG. 7, it is assumed that the paging controller and the MS have prior knowledge of the lazy location update threshold being '4'. The lazy location update threshold is transmitted to the MS by a MOB_PAG-ADV message.

When the paging controller pages the MS a first time in an $n^{th}$ PLI and fails to receive a response for the paging from the MS, the paging controller updates a paging cycle using a paging backoff window value according to equation (2) and performs paging after the updated paging cycle.

For example, the paging controller selects '7' randomly from among the natural numbers ranging from Wmin '1' to Wmax '8' as the paging backoff window value. The natural number '8' is a product between the lazy location update threshold '4' and $2^{\text{paging re-attempt number }1}$. The paging controller adds the product between a current paging cycle 700 and '7' to the index of the current frame, n by equation (2), and sets the sum (n+7) 705 as the index of the next paging start frame. That is, the paging controller re-attempts the paging to the MS a first time in the $(n+7)^{th}$ PLI 705 among $(n+1)^{th}$ to $(n+8)^{th}$ PLIs. If the paging controller fails to receive a response for the first paging re-attempt from the MS, the paging controller selects a random number from among the natural numbers ranging from Wmin '1' to Wmax, '16' as the paging backoff window value. The natural number '16' is a product between the lazy location update threshold '4' and $2^{\text{paging re-attempt number }2}$. Table 1 below illustrates a format of a MOB_PAG-ADV message according to an exemplary embodiment of the present invention. The MOB_PAG-ADV message is formatted in compliance with IEEE 802.16e, for example.

TABLE 1

| Syntax | Size | Notes |
|---|---|---|
| Generic MAC Header_format( ) { | | |
| Header Type | 1 bit | Shall be set to zero<br>/* 0 = Generic MAC Header<br>1 = Bandwidth Request Header */ |
| Encryption Control | 1 bit | Shall be set to zero<br>/* 0 = Payload is not encrypted or payload is not included<br>1 = Payload is encrypted */ |
| Type | 6 bits | This field indicates the subheaders and special payload types present in the message payload |
| ESF (Extended Subheader Field) | 1 bit | Extended subheader field |
| CRC Indicator | 1 bit | 0 = No CRC is appended<br>1 = CRC is appended to the PDU |
| Encryption Key Sequence | 2 bits | Shall be ignored |
| Reserved | 1 bit | Shall be set to zero |
| Length | 11 bits | The length in bytes of the MAC PDU including the MAC header and the CRC if present. |
| CID | 16 bits | Broadcast CID = 0xFFFF |
| Header Check Sequence | 8 bits | An 8-bit field used to detect errors in the header. |
| } | | |
| MOB_PAG-ADV_Message_format( ) { | | |
| Management Message Type = 61 | 8 bits | — |
| Num_Paging_Group_IDs | 8 bits | Number of Paging Group IDs in this message |
| For(i=0; i<Num_Paging_Group_IDs; i++){ | | |
| Paging Group ID | 16 bits | One or more logical affiliation groupings of BS |
| } | | |

TABLE 1-continued

| Syntax | Type | Length | Value |
|---|---|---|---|
| Num_MACs | | 8 bits | Number of MS MAC addresses |
| For(i=0; i<Num_MACs; i++){ | | | |
| MS MAC Address Hash | | 24 bits | The hash is obtained by computing a CRC24 on the MS 48-bit MAC address. The polynomial for the calculation is 0x1864CFB |
| Action Code | | 2 bits | Paging action instruction to MS<br>0b00 = No Action Required<br>0b01 = Perform Ranging to establish location and acknowledge message<br>0b10 = Enter Network<br>0b11 = reserved |
| Reserved<br>} | | 6 bits | |
| TLV Encoded Neighbor Information | | var | TLV Specific |
| CDMA Code and Transmission Opportunity Assignment | 150 | var | Refer to Section 11.17.1 |
| Page-Response Window | 152 | 1 | Refer to Section 11.17.2 |
| Lazy Location Update | TBD | 2 | Bit#0~#1: Lazy Location Update Allowance Indicator<br>0b00: not allowed (default)<br>0b01: allowed as the Lazy Location Update Count defined by Bit#2~#15<br>0b10: allowed as the Lazy Location Update Timer defined by Bit#2~#15<br>0b11: reserved<br>Bit#2~#15: Indicates Lazy Location Update Count or Timer<br>If Bit#0-#1 = 0b01, It indicates Lazy Location Update Count.<br>If Bit#0-#1 = 0b10, It indicates Lazy Location Update Timer. If Bit#2~#15 = 0, System doesn't constrain the timer value and the timer depends on MS Implementation. |

Referring to Table 1, certain lazy location update information preset between the MS and the BS is set in the Lazy Location Update TLV field of the TLV-encoded neighbor information in the MOB_PAG-ADV message.

Bit #0 to Bit #1 are set to a lazy location update allowance indicator. That is, if Bit #0 to Bit #1 is '0b00', a lazy location update is not allowed.

If Bit #0 to Bit #1 is '0b01', a lazy location update is allowed according to a certain lazy location update threshold. The lazy location update threshold is set in Bit #2 to Bit #15.

If Bit #0 to Bit #1 is '0b10', a lazy location update is allowed according to a value of the timer of the MS. The timer value is set in Bit #2 to Bit #15. If the value of Bit #2 to Bit #15 is '0', the MS autonomously sets a timer value.

Figure 8:
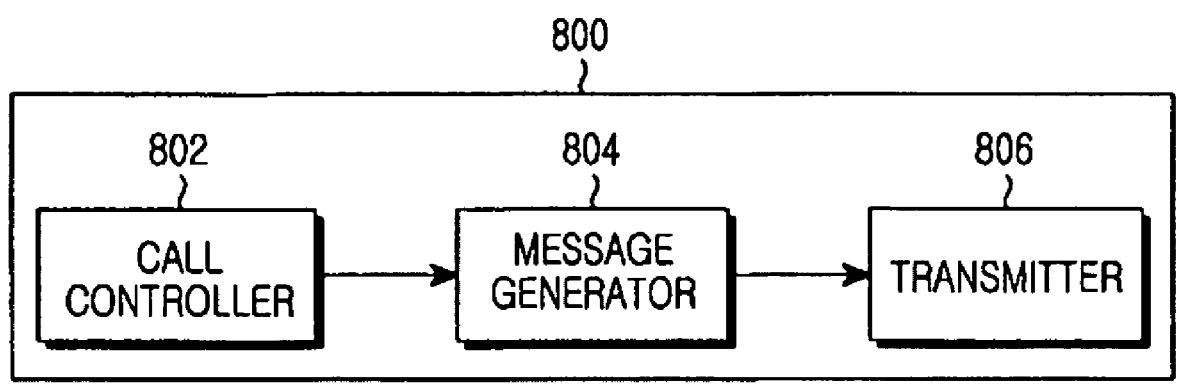
FIG. 8 is a block diagram of a paging controller according to an exemplary embodiment of the present invention.

FIG. 8 is a block diagram of a paging controller according to an exemplary embodiment of the present invention.

Referring to FIG. 8, a paging controller 800 includes a call controller 802, a message generator 804 and a transmitter 806.

The call controller 802 determines whether to allow a lazy location update to the MS, taking into account the type of data traffic to the MS and the location of the MS. The call controller 802 notifies the message generator 804 of the determination result.

The message generator 804 sets the Lazy Location Update TLV field of a MOB_PAG-ADV message according to the determination result.

The transmitter 806 transmits the MOB_PAG-ADV message to the preferred BS of the MS, which transmits the MOB_PAG-ADV message to the MS in a PLI.

As is apparent from the above description, exemplary embodiments of the present invention may reduce system load and power consumption of an MS by delaying a location update of the MS in a cell having clear mobility characteristics equivalent to indoor environment. As the location update of the MS is delayed in a bad channel environment, the success rate of location update signaling is increased. Also, mismatch regarding MS location information between the MS and a system is prevented. Further, paging-incurred overhead is reduced in a system supporting non-real-time traffic service mainly. Accordingly, competitiveness of the system is improved.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A location update method of a Mobile Station (MS) operating in an idle mode in a communication system, the method comprising:
   receiving a broadcasting message from a preferred Base Station (BS) during a Paging Listening Interval (PLI);
   determining whether a paging group is changed and, if the paging group is changed, verifying lazy location update information included in the broadcasting message to delay a location update of the MS; and updating a location of the MS according to the lazy location update information, wherein the location updating comprises:

comparing the number of location update attempts of the MS with a threshold set in the lazy location update information, if the lazy location update information indicates a threshold-based location update; and updating the location of the MS, if the number of location update attempts of the MS is equal to or greater than the threshold.

2. The method of claim 1, wherein the determining of whether the paging group is changed comprises comparing a last paging group Identifier (ID), that the MS is aware of, with a paging group ID included in the broadcasting message.

3. The method of claim 1, wherein the location updating comprises:

determining whether a predetermined time of a timer of the MS is expired, if the lazy location update information indicates a timer-based location update; and updating the location of the MS, if the predetermined time is expired.

4. The method of claim 1, wherein the location updating comprises updating the location of the MS, if one of the lazy location update information is not included in the broadcasting message and the lazy location update information indicates that the lazy location update is not allowed to the MS.

5. A method for controlling a location update of a Mobile Station (MS) in a paging controller that manages at least one MS operating in an idle mode in a communication system, the method comprising:

determining a type of downlink data traffic for the MS, upon generation of the downlink data traffic during a Paging Listening Interval (PLI) of the MS operating in the idle mode;

generating lazy location update information for controlling a lazy location update of the MS, if the type of downlink data traffic is not real-time traffic; and transmitting a broadcasting message including the lazy location update information to the MS through a preferred Base Station (BS) of the MS and paging the MS in accordance with the lazy location update information, wherein the lazy location update information comprises a first threshold and information indicating a location update when the number of location update attempts of the MS is greater than the first threshold.

6. The method of claim 5, wherein the generating of the lazy location update information comprises determining if location characteristics of the MS comprise inertia in mobility.

7. The method of claim 5, wherein if the type of downlink data traffic is Best Effort (BE), the lazy location update information comprises information indicating a predetermined time and information indicating a location update when the predetermined time of a timer of the MS is expired.

8. The method of claim 5, wherein the paging of the MS comprises:

paging the MS during the PLI and determining whether the paging is successful;

determining a next PLI, if the paging failed and the number of paging re-attempts is equal to or greater than a second threshold; and transmitting the next PLI to the MS through the preferred BS and re-attempting paging to the MS during the next PLI.

9. The method of claim 8, wherein the determining of the next PLI comprises:

selecting one of natural numbers equal to or less than a product between the number of paging re-attempts and the first threshold; and determining the next PLI by adding a product between a cycle of the PLI and the selected natural number to a current frame.

10. The method of claim 8, wherein the determining of the next PLI comprises:

selecting one of natural numbers equal to or less than a product between $2^{the\ number\ of\ paging\ re-attempts}$ and the first threshold; and determining the next PLI by adding a product between a cycle of the PLI and the selected natural number to a current frame.

11. The method of claim 5, wherein the lazy location update information comprises information indicating that a lazy location update is not allowed to the MS, if the type of downlink data traffic is real-time traffic.

12. A location update controlling system in a communication system, the location update controlling system comprising:

a Mobile Station (MS) for operating in an idle mode, for receiving a broadcasting message from a preferred Base Station (BS) during a Paging Listening Interval (PLI), for determining whether a paging group is changed, for verifying lazy location update information included in the broadcasting message to delay a location update of the MS, if the paging group is changed and for updating a location of the MS according to the lazy location update information, wherein the MS compares a number of location update attempts of the MS with a threshold set in the lazy location update information, if the lazy location update information indicates a threshold-based location update and updates the location of the MS, if the number of location update attempts of the MS is equal to or greater than the threshold.

13. The location update controlling system of claim 12, wherein the MS determines whether the paging group is changed by comparing a last paging group Identifier (ID), that the MS is aware of, with a paging group ID included in the broadcasting message.

14. The location update controlling system of claim 12, wherein the MS determines whether a predetermined time of a timer of the MS is expired, if the lazy location update information indicates a timer-based location update and updates the location of the MS, if the a predetermined time is expired.

15. The location update controlling system of claim 12, wherein the MS updates the location of the MS, if one of the lazy location update information is not included in the broadcasting message and the lazy location update information indicates that a lazy location update is not allowed to the MS.

16. A location update controlling system in a communication system, the location update controlling system comprising a paging controller for controlling a location update of a Mobile Station (MS) operating in an idle mode, wherein the paging controller comprises:

a call controller for determining a type of downlink data traffic for the MS, upon generation of the downlink data traffic during a Paging Listening Interval (PLI) of the MS;

a message generator for generating lazy location update information for controlling a lazy location update of the MS, if the type of downlink data traffic is not real-time traffic; and a transmitter for transmitting a broadcasting message comprising the lazy location update information to the MS through a preferred Base Station (BS) of the MS and paging the MS in accordance with the lazy location update information, wherein the call controller controls the message generator so that lazy location update information comprises a first threshold and information indicating a location update when a number of location update attempts of the MS is greater than the first threshold.

17. The location update controlling system of claim 16, wherein the call controller controls the message generator to generate the lazy location update information, if location characteristics of the MS comprises inertia in mobility.

18. The location update controlling system of claim 16, wherein if the type of downlink data traffic is Best Effort (BE), the call controller controls the message generator so that the lazy location update information comprises information indicating a predetermined time and information indicating a location update when the predetermined time period of a timer of the MS is expired.

19. The location update controlling system of claim 16, wherein the call controller pages the MS during the PLI, determines whether the paging is successful, determines a next PLI if the paging failed and a number of paging re-attempts is equal to or greater than a second threshold, and controls the transmitter to transmit the next PLI to the MS through the preferred BS and to re-attempt paging to the MS during the next PLI.

20. The location update controlling system of claim 19, wherein the call controller selects one of natural numbers equal to or less than a product between the number of paging re-attempts and the first threshold, and determines the next PLI by adding a product between a cycle of the PLI and the selected natural number to a current frame.

21. The location update controlling system of claim 19, wherein the call controller selects one of natural numbers equal to or less than a product between $2^{the\ number\ of\ paging\ re-attempts}$ and the first threshold, and determines the next PLI by adding a product between a cycle of the PLI and the selected natural number to a current frame.

22. The location update controlling system of claim 16, wherein the call controller controls the message generator so that the lazy location update information comprises information indicating that a lazy location update is not allowed to the MS, if the type of downlink data traffic is real-time traffic.

* * * * *